United States Patent
Oroskar et al.

(10) Patent No.: US 9,578,584 B1
(45) Date of Patent: Feb. 21, 2017

(54) CONTROLLING TUNE-AWAY OF USER EQUIPMENT DEVICES

(71) Applicant: Sprint Spectrum L.P., Overland Park, KS (US)

(72) Inventors: Siddharth S. Oroskar, Overland Park, KS (US); Jasinder P. Singh, Olathe, KS (US); Nitesh Manchanda, Overland Park, KS (US); Rajil Malhotra, Olathe, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 0 days.

(21) Appl. No.: 15/057,930

(22) Filed: Mar. 1, 2016

(51) Int. Cl.
*H04W 36/00* (2009.01)
*H04W 36/24* (2009.01)
*H04W 36/36* (2009.01)
*H04W 36/30* (2009.01)
*H04L 5/00* (2006.01)

(52) U.S. Cl.
CPC ............ *H04W 36/36* (2013.01); *H04L 5/0007* (2013.01); *H04W 36/0061* (2013.01); *H04W 36/24* (2013.01); *H04W 36/30* (2013.01)

(58) Field of Classification Search
CPC .... H04W 4/00; H04W 36/0083; H04W 36/14; H04W 36/30
USPC ............................ 355/436–444; 370/331–333
See application file for complete search history.

(56) References Cited

U.S. PATENT DOCUMENTS

| | | | |
|---|---|---|---|
| 8,942,129 B1 | 1/2015 | Prock et al. | |
| 2013/0295920 A1* | 11/2013 | Viswanadham | H04W 36/14 455/426.1 |
| 2014/0146732 A1* | 5/2014 | Olufunmilola | H04W 24/10 370/311 |
| 2014/0241322 A1* | 8/2014 | Kim | H04W 36/023 370/331 |
| 2015/0327295 A1 | 11/2015 | Yang et al. | |
| 2016/0029274 A1* | 1/2016 | Ng | H04W 36/14 455/437 |
| 2016/0242091 A1* | 8/2016 | Krishnamoorthy | H04B 17/318 |

* cited by examiner

*Primary Examiner* — Allahyar Kasraian

(57) ABSTRACT

A method for controlling tune-away of a UE from its serving base station during handover, where the UE is configured to tune away from its serving base station at scheduled tune-away times, is disclosed herein. The method includes, between a first scheduled tune-away time and a next, second scheduled tune-away time, (a) determining that the UE has threshold weak signal strength from the serving base station, and (b) responsive to determining that the UE has threshold weak signal strength from the serving base station, determining a remaining battery energy level of the UE. The method further includes, based at least in part on the determined remaining battery energy level of the UE, causing the UE to tune away from the serving base station before the second scheduled tune-away time to scan for target coverage.

19 Claims, 6 Drawing Sheets

CONTROLLING TUNE-AWAY OF USER EQUIPMENT DEVICES

BACKGROUND

Unless otherwise indicated herein, the information described in this section is not itself prior art to the claims and is not admitted to be prior art by inclusion in this section.

A typical wireless communication system may include one or more base stations, each radiating to define one or more coverage areas, such as cells and cell sectors, in which user equipment devices (UEs) such as cell phones, tablet computers, tracking devices, embedded wireless modules, and other wirelessly equipped communication devices, can operate. Further, each base station of the system may then be coupled or communicatively linked with network infrastructure such as a switch or gateway that provides connectivity with one or more transport networks, such as the public switched telephone network (PSTN) and/or the Internet for instance. With this arrangement, a UE within coverage of the system may thus engage in air interface communication with a base station and thereby communicate via the base station with various remote network entities or with other UEs served by the system.

In general, a wireless communication system may operate in accordance with a particular air interface protocol or radio access technology, with communications from a base station to UEs defining a downlink or forward link and communications from the UEs to the base station defining an uplink or reverse link. Examples of existing air interface protocols include, without limitation, Orthogonal Frequency Division Multiple Access (OFDMA) (e.g., Long Term Evolution (LTE) or Wireless Interoperability for Microwave Access (WiMAX)), Code Division Multiple Access (CDMA) (e.g., 1×RTT and 1×EV-DO), Global System for Mobile Communications (GSM), WI-FI, and BLUETOOTH. Each protocol may define its own procedures for registration of UEs, initiation of communications, handoff between coverage areas, and functions related to air interface communication.

In accordance with the air interface protocol, each of the one or more coverage areas of such a system may operate on one or more carrier frequencies and may define a number of air interface channels for carrying information between the base station and UEs. By way of example, each coverage area may define a pilot channel, reference channel, or other resource on which the base station may broadcast a pilot signal, reference signal, or the like that UEs may detect as an indication of coverage and may measure to evaluate coverage strength. Further, each coverage area may define a downlink control channel for carrying system information, page messages, and other control signaling from the base station to UEs, and an uplink control channel for carrying service requests and other control signaling from UEs to the base station, and each coverage area may define downlink and uplink traffic channels or the like for carrying bearer traffic between the base station and UEs.

When a UE initially enters into coverage of a wireless communication system (e.g., powers on in coverage of the system), the UE may detect a reference signal and read system information broadcast from a base station and may engage in a process to register itself to be served by the base station and generally by the system. For instance, the UE may transmit an attach message on an uplink control channel to the base station, and the base station and/or supporting infrastructure may then responsively authenticate and authorize the UE for service, establish a record indicating where in the system the UE is operating, establish local profile or context records for the UE, and provide an attach accept message to the UE. Thereafter, the UE may then be served by the system in an idle mode or a connected/active mode. In the idle mode, the UE may monitor a downlink control channel to detect page messages and other information regarding incoming communications and may similarly transmit uplink control signaling to initiate communications or for other reasons. In the connected/active mode, the UE may continue to monitor the downlink control channel and may have particular traffic channel resources assigned by the system, which the UE may use to engage in communication of bearer traffic and the like.

When a UE is served in a particular base station coverage area, the UE may also regularly monitor the reference signal strength in its serving coverage area and in neighboring coverage areas of the system, in an effort to ensure that the UE operates in the best (e.g., strongest) coverage area. In order to monitor the reference signal strength in neighboring coverage areas, the UE may need to pause its operation with and tune away from its serving base station. This tuning away may be necessary, for instance, if the serving base station operates on a different carrier frequency than a neighboring base station, as the UE may need to tune away from its serving carrier frequency to communicate on another carrier frequency with the neighboring base station. Further, the tuning away may be necessary if the serving base station operates on a different air interface protocol than the neighboring base station, as the UE may need to switch between radio interfaces in order to communicate on another air interface protocol with the neighboring base station.

To facilitate the UE tuning away from its serving base station to monitor the reference signal strength in neighboring coverage areas, the serving base station may schedule tune-away times. During the scheduled tune-away times, the serving base station may stop transmitting data to the UE, so the UE can tune away from the serving base station to scan for other coverage and/or monitor the reference signal strength in other coverage areas without missing any data from the serving base station. This may be referred to as a normal discontinuous reception (DRX) mode. The tune-away times may be scheduled in response to detecting a period of inactivity in communication between the UE and the serving base station, they may be scheduled when the serving base station has no remaining data to transmit to the UE, or they may be scheduled at regularly recurring times, among other possibilities.

If the UE detects threshold weak coverage from its serving coverage area and sufficiently strong coverage from another coverage area, the UE may then engage in a handover process by which the UE transitions to be served by the other coverage area. In the idle mode, the UE may do this autonomously and might re-register in the new coverage area. Whereas, in the connected/active mode, the UE may report signal strengths to its serving base station when certain thresholds are met, and the base station and/or supporting infrastructure may work to hand the UE over to another coverage area such as a neighboring base station.

In order to hand the UE over to the neighboring base station, the serving base station may require certain identifying information associated with the neighboring base station, such as an enhanced cell global identity (ECGI). If the serving base station does not already have access to the identifying information, then the UE may need to obtain the information from the neighboring base station and report it to the serving base station. In situations where the handover is being carried out while the UE is operating in the connected/active mode, the UE may need to tune away from the serving base station to obtain the identifying information from the neighboring base station.

OVERVIEW

In practice, a UE may be operating in the connected/active mode with its serving base station. The UE may attempt to engage in a handover process from its serving base station to a neighboring base station in response to detecting threshold weak coverage from its serving base station and/or sufficiently strong coverage from the neighboring base station. As part of the handover process, the UE may report to its serving base station the signal strength of the neighboring base station along with identifying information, such as a physical cell identity (PCI), of the neighboring base station. If the serving base station does not recognize the identifying information of the neighboring base station, the serving base station may direct the UE to obtain further identifying information, such as an enhanced cell global identity (ECGI) from the neighboring base station.

As discussed above, the UE may need to temporarily pause operation with its serving base station while it tunes away in order to obtain the further identifying information from the neighboring base station, for instance if the neighboring base station operates on a different carrier frequency or air interface protocol than the serving base station. In particular, the UE may be configured to wait until the next scheduled tune-away time period to tune away from the serving base station and obtain the identifying information by operating in the normal DRX mode for instance. Alternatively, the UE may be configured to tune away from the serving base station without waiting until the next scheduled tune-away time period. In this configuration, the UE may be said to tune away during autonomous gaps. The UE may determine on its own to tune away during autonomous gaps, or it may do so in response to receiving an instruction from its serving base station.

Waiting until the next scheduled tune-away time to tune away from the serving base station and obtain the identifying information may add significant delay to the handover process. This may be especially so in situations where the tune-away times are scheduled in response to detecting inactivity in communication between the UE and the serving base station, as the next period of inactivity may not occur for a significant amount of time. Delaying the handover process can be particularly problematic if the UE has weak signal strength from its serving base station, as weak signal strength may result in dropped or stalled communications.

On the other hand, pausing the UE's operation with its serving base station without waiting for the next scheduled tune-away time can be problematic as well, as the pause may disrupt the flow of the UE's communication in the coverage area of the serving base station. This is especially so if the UE is engaged in an active data communication, as the disruption in flow of the UE's communication may result in overall reduced data throughput.

Furthermore, in order to obtain further identifying information from the neighboring base station, the UE may need to scan for and monitor a reference signal from the neighboring base station. This may be problematic if the UE is configured to run on battery power, as the scanning process can consume a significant amount of battery power. Also, if the UE's battery is running low on charge, scanning for and monitoring the reference signal risks rapidly depleting the remaining battery power, causing the UE to turn off and disrupting the flow of communication between the UE and its serving base station. Accordingly, in situations where the UE's battery has very low charge remaining, it may be desirable to delay tuning away from the serving base station in order to avoid disruption in communication.

Disclosed herein is an improved method and apparatus to help manage the handover process of a UE in a wireless communication system by dynamically controlling when the UE tunes away from its serving base station. The UE, which may be configured to tune away from its serving base station at scheduled tune-away times, may instead tune away from its serving base station without waiting for the next scheduled tune-away time based on certain operating conditions of the UE, such as the UE's remaining battery energy level. For example, if the remaining battery energy level of the UE is threshold high, then the UE may tune away from its serving base station without waiting for the next scheduled tune-away time. On the other hand, if the remaining battery energy level of the UE is threshold low, then the UE may wait to tune away from its serving base station until the next scheduled tune-away time.

Accordingly, in one respect, disclosed is a method operable by a UE or its serving base station, where the UE is configured to tune away from the serving base station at scheduled tune-away times to scan for target coverage. The method includes, between a first scheduled tune-away time and a next, second scheduled tune-away time, (a) determining that the UE has threshold weak signal strength from the serving base station, and (b) responsive to determining that the UE has threshold weak signal strength from the serving base station, determining a remaining battery energy level of the UE. The method further includes, based at least in part on the determined remaining battery energy level of the UE, causing the UE to tune away from the serving base station before the second scheduled tune-away time to scan for target coverage.

In another respect, disclosed is another method operable by a UE or its serving base station, where the UE is configured to tune away from the serving base station at scheduled tune-away times to scan for target coverage. The method includes, between a first scheduled tune-away time and a next, second scheduled tune-away time, (a) determining that the UE has threshold weak signal strength from the serving base station, (b) responsive to determining that the UE has threshold weak signal strength from the serving base station, determining whether an early tune-away trigger condition is met, where the early tune-away trigger condition includes a remaining battery energy level of the UE being above a threshold energy level. Responsive to determining that the early tune-away trigger condition is met, the method further includes causing the UE to tune away from the serving base station before the second scheduled tune-away time to scan for target coverage. Alternatively, responsive to determining that the early tune-away trigger condition is not met, the method further includes causing the UE to wait for the second scheduled tune-away time to tune away from the serving base station.

And in yet another respect, disclosed is a base station that is configured to serve a UE over an air interface, where the UE is configured to tune away from the base station at scheduled tune-away times to scan for target coverage. The base station receives from the UE, between a first scheduled tune-away time and a next, second scheduled tune-away time, an indication that the UE has threshold weak signal strength from the base station. Responsive to receiving the indication, the base station determines whether an early tune-away trigger condition is met, where the early tune-away trigger condition includes a remaining battery energy level of the UE being above a threshold energy level. If the base station determines that the early tune-away trigger condition is met, then the base station causes the UE to tune away from the base station before the second scheduled tune-away time to scan for target coverage. Alternatively, if the base station determines that the early tune-away trigger condition is not met, then the base station causes the UE to wait for the second scheduled tune-away time to tune away from the base station.

These as well as other aspects, advantages, and alternatives will become apparent to those of ordinary skill in the art by reading the following detailed description, with reference where appropriate to the accompanying drawings. Further, it should be understood that the descriptions provided in this overview and below are intended to illustrate the invention by way of example only and not by way of limitation.

DETAILED DESCRIPTION

Figure 1:
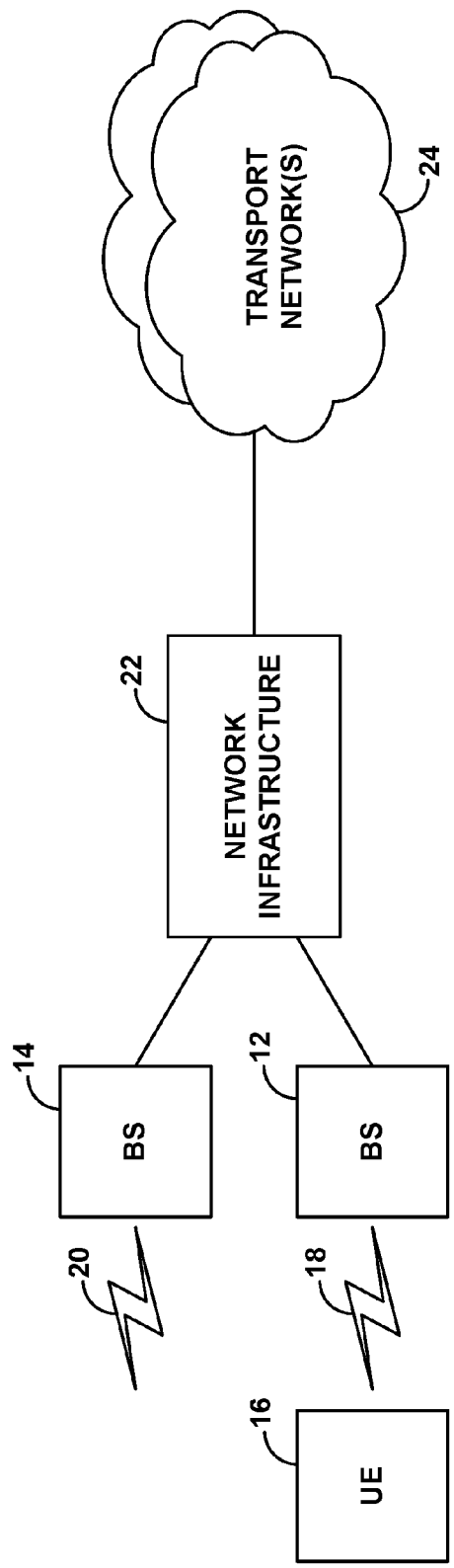
FIG. 1 is a simplified block diagram of an example wireless communication system in which aspects of the present disclosure can be implemented.

Referring to the drawings, as noted above, FIG. 1 is a simplified block diagram of an example wireless communication system in which features of the present disclosure can be implemented. It should be understood that this and other arrangements and processes described herein are set forth for purposes of example only, and that other arrangements and elements (e.g., machines, interfaces, functions, orders of elements, etc.) can be added or used instead and some elements may be omitted altogether. In addition, those skilled in the art will appreciate that many of the elements described herein are functional entities that may be implemented as discrete components or in conjunction with other components, in any suitable combination and location, and that various disclosed functions can be implemented by any combination of hardware, firmware, and/or software, such as by one or more processing units programmed to execute computer instructions for instance.

The system of FIG. 1 includes base stations 12 and 14 radiating to define coverage areas. The illustrated communication system may operate in accordance with a particular radio access technology such as CDMA and LTE, as noted above. By way of example, the system may be an LTE radio access network (RAN), in which case each base station may be an LTE eNodeB, and the supporting network infrastructure may include elements such as a mobility management entity (MME), serving gateway (SGW) and a packet data network gateway (PGW). As another example, the system may be a CDMA RAN, in which case each base station may be a CDMA base station known as a base transceiver station (BTS), and the supporting network infrastructure may include elements such as a base station controller (BSC), radio network controller (RNC), mobile switching center (MSC), and packet data serving node (PDSN). Other examples are possible as well. Further, while some example wireless communication systems of the present disclosure are described in the context of LTE communication, it should be understood that principles of the disclosure can extend to various other air interface protocols as well, with variations where appropriate.

FIG. 1 further depicts an example user equipment device (UE) 16 positioned in range of air-interface communication with the base stations 12 and 14. UE 16 may receive wireless service from one of the base stations 12 and 14 and may thereby communicate with various remote network entities or with other UEs via network infrastructure 22 and perhaps via one or more transport networks 24.

In operation, each base station in the example communication system may radiate to define an air-interface. The air-interface may include a downlink or forward link for carrying communications from the serving base station to served UEs, and an uplink or reverse link for carrying communications from served UEs to the serving base station. In one instance, FIG. 1 shows air interfaces 18 and 20. Each of air interfaces 18 and 20 may include a downlink and an uplink for communicating with UE 16. Depending on the radio access technology, these air interface links may take various forms and may define various channels for carrying particular data, such as control data and bearer traffic for instance.

In an LTE system, for example, each of air interfaces 18 and 20 may define a Physical Downlink Shared Channel (PDSCH) as a primary channel for carrying data from the base stations to UEs, and a Physical Downlink Control Channel (PDCCH) for carrying control signaling from the base stations to UEs. Further, air interfaces 18 and 20 may define a Physical Uplink Shared Channel (PUSCH) as a primary channel for carrying data from UEs to the base stations, and a Physical Uplink Control Channel (PUCCH) for carrying control signaling from UEs to the base stations.

By way of example, each base station may define a pilot channel or reference channel for each of its coverage areas on which the base station may broadcast a pilot signal or reference signal that UEs may detect as an indication of coverage and may measure to determine coverage strength. Further, each base station may define a control channel that carries various overhead messages, such as system information blocks (SIBs) or the like, specifying characteristics and operational parameters of the base station.

Each base station may also have a respective identifier, such as a physical cell ID (PCI) or a pseudo-noise (PN) offset, associated with each of its coverage areas. Each coverage area identifier may be indicated to UEs and other base stations by the pilot or reference signal or specified in another overhead broadcast message or signal.

Each base station may also maintain a neighbor list of nearby coverage areas, and a base station may refer to its neighbor list when communicating with neighboring base stations. Within the neighbor list, base station coverage areas may be identified by their respective coverage area identifier. Further, for each neighboring base station coverage area in the neighbor list, the neighbor list may include an address, such as an IP address, for the neighboring base station that is providing the neighboring coverage area. Each address may be used to reference a particular base station when communicating with that base station.

When a UE first powers on or enters into coverage of the network, the UE may scan for pilot or reference signals and determine for each detected signal a signal level (e.g., receive strength or signal-to-noise ratio) and a corresponding coverage area identifier. The UE may thereby determine a coverage area providing the strongest pilot or reference signal and may engage in a process to register with the network by transmitting an attach request (registration request) to the base station that is providing that signal. In one instance, UE 16 may identify a coverage area of base station 12 as providing the strongest pilot or reference signal. UE 16 may then transmit an attach request to base station 12 where the attach request specifies the coverage area of base station 12 by its coverage area identifier.

At the time of attachment or thereafter, a UE may also engage in signaling with the base station to enter into a connected mode, in which the UE and base station have a radio link connection over which the UE can engage in bearer communication with the base station and thereby with various other entities. In the connected mode, for instance, the UE may engage in packet data communications on the Internet and/or a voice call on the PSTN.

While the UE is in the connected mode, the base station may be responsible for allocating shared channel resources for carrying communications between the base station and the UE. In practice, for instance, when the UE has bearer data to transmit to the base station, the UE may transmit to the base station a scheduling request that indicates a desire to transmit the bearer data. The base station may then respond to such a request by allocating a small portion of uplink shared channel resources for use by the UE to transmit a "buffer status report" (BSR) indicating how much data the UE has buffered for transmission, and the UE may transmit the BSR using those allocated resources. Upon receipt of the BSR from the UE, the base station may then allocate to the UE an appropriate extent of uplink shared channel resources, and at that point the UE may then transmit bearer data to the base station using those allocated resources.

Further, while in the connected mode, the UE may continue to regularly scan pilot or reference signals, from both the coverage area serving the UE and from various neighboring coverage areas. But in order to scan for pilot or reference signals and monitor the signal strength in neighboring coverage areas, the UE may need to pause its operation with and tune away from its serving base station. This tuning away may be necessary, for instance, if the serving base station operates on a different carrier frequency or air interface protocol than the neighboring coverage areas.

As noted above, to facilitate the UE tuning away from its serving base station to scan for pilot or reference signals and monitor the signal strength in neighboring coverage areas, the serving base station may schedule tune-away times. During the scheduled tune-away times, the serving base station may stop transmitting data to the UE, so the UE can tune away from the serving base station to scan for other coverage and/or monitor the reference signal strength in neighboring coverage areas without missing any data from the serving base station. The serving base station may schedule the tune-away times by transmitting a tune-away start time and a tune-away duration over a control channel to the UE. In an LTE system, for instance, the serving base station may indicate an upcoming LTE subframe as the tune-away start time, and the tune-away duration may be indicated by a time duration or a number of LTE frames or subframes. Such information may be transmitted from the base station to the UE in an overhead message, such as an SIB, or in an RRC connection reconfiguration message over a PDCCH for instance.

As the UE tunes away from its serving base station to scan for and monitor pilot or reference signals from various neighboring coverage areas, the UE may determine the signal level and the identities of those coverage areas. The UE may then transmit to its serving base station a measurement report that specifies the signal level of each coverage area detected by the UE. In particular, the measurement report may specify each detected coverage area (e.g., by coverage area identifier) and the signal level (e.g., reference signal receive strength, or signal-to-noise ratio) of the coverage area as determined by the UE. In practice, a given measurement report may thus include such information for the UE's currently serving coverage area and may also include such information for each of one or more neighboring coverage areas detected by the UE.

When the serving base station receives such a measurement report from the UE, if the measurement report specifies a signal level of a neighboring coverage area, the base station or other network node may engage in a process to decide whether to trigger handover of the UE to the neighboring coverage area. In general, this process may involve evaluating the reported signal level of the serving coverage area to determine whether it is sufficiently weak, evaluating the reported signal level of the neighboring coverage area to determine whether it is sufficiently strong itself, and/or evaluating whether the reported signal level of the neighboring coverage area is sufficiently stronger than the reported signal level of the serving coverage area. Further, the process may involve consideration of other factors as well, such as load and backhaul capacity for instance.

If the serving base station decides to trigger handover of the UE to a coverage area of a neighboring base station, the serving base station may then reference its neighbor list of nearby coverage areas. The serving base station may then find a particular coverage area having a matching identifier to the target coverage area in the neighbor list. Next, the serving base station may transmit to the neighboring base station, either over a direct inter-base-station interface or through the one or more other network entities, a handover request message that requests the neighboring base station to provide service to the UE through the target coverage area. The handover request message may specify the target coverage area using the coverage area identifier of the target. The neighboring base station may then engage in a handover preparation process to establish a radio link for the UE, and the UE may then ultimately transition to be served instead by the neighboring base station.

If, when referencing its neighbor list of nearby coverage areas, the serving base station does not find a coverage area having an identifier that matches the identifier reported by the UE, then the serving base station may instruct the UE to obtain further identifying information from the neighboring base station in order to allow the serving base station to communicate with the neighboring base station. Once communication is established between the serving base station and the neighboring base station, the serving base station may work to handover the UE to the neighboring base station.

In an LTE system, for instance, a neighboring eNodeB may periodically broadcast over a PDSCH its E-UTRAN cell global identifier (ECGI) as part of a system information block (SIB). The UE may scan for and monitor the PDSCH to obtain the ECGI from the neighboring eNodeB and report this information to its serving eNodeB. Next, the serving eNodeB may query the MME to map the ECGI to an IP address as well as other information of the neighboring eNodeB to enable the serving eNodeB to engage in signaling with the neighboring eNodeB. The serving eNodeB may then send a handover request to the neighboring eNodeB, the neighboring eNodeB may establish a radio link for the UE, and the UE may transition to be served by the neighboring eNodeB.

However, as discussed above, in order to obtain the further identifying information from the neighboring base station, the UE may need to tune away from the serving base station, if the serving base station operates on a different carrier frequency or air interface protocol than the neighboring base station for instance. Tuning away from the serving base station may disrupt the flow of the UE's communication in the coverage area of the serving base station, especially if the UE is engaged in an active data communication. In order to avoid such a disruption in communication, the UE may be configured to wait until the next scheduled tune-away time. Because the serving base station stops communicating with the UE during scheduled tune-away times, the UE may freely tune away from the serving base station without missing any information from the base station.

On the other hand, waiting until the next scheduled tune-away time to tune away and obtain the further identifying information from the neighboring base station may delay the handover process, which can be especially problematic if the UE has weak signal strength from its serving base station, as weak signal strength may result in dropped or stalled communications. Thus, the UE may alternatively be configured to tune away without waiting for the next scheduled tune-away time. But again, tuning away may disrupt the flow of the UE's communication in the coverage area of the serving base station.

Furthermore, in order to obtain further identifying information from the neighboring base station, the UE may need to scan for and monitor a reference signal from the neighboring base station. And as noted above, this scanning process can consume a significant amount of battery power, which may be particularly problematic if the UE's battery is running low on charge, as it risks rapidly depleting the remaining battery power. As a result of losing battery power, the UE may turn off, thereby disrupting the flow of communication between the UE and its serving base station.

In order to balance the above concerns, the time at which a UE tunes away from its serving base station to obtain further identifying information from the neighboring base station during the handover process may depend on certain operating conditions of the UE in accordance with the present disclosure, such as the UE's remaining battery level. For example, if the total remaining battery energy level of the UE is threshold high, then the UE may tune away from its serving base station without waiting for the next scheduled tune-away time. On the other hand, if the total remaining battery energy level of the UE is threshold low, then the UE may wait to tune away from its serving base station until the next scheduled tune-away time.

Additionally, the time at which a UE tunes away from its serving base station during the handover process may depend on further operating conditions of the UE in accordance with the present disclosure, such as an amount of data buffered for transmission between the UE and the serving base station. For example, if the amount of data buffered for transmission between the UE and the serving base station is threshold low and if the total remaining battery energy level of the UE is threshold high, then the UE may tune away from its serving base station without waiting for the next scheduled tune-away time. On the other hand, if the amount of data buffered for transmission between the UE and the serving base station is threshold high or if the total remaining battery energy level of the UE is threshold low, then the UE may wait to tune away from its serving base station until the next scheduled tune-away time. The amount of buffered data may include an amount of data buffered for transmission from the UE to the base station, an amount of data buffered for transmission from the base station to the UE, or a combination of the two.

To illustrate, consider an arrangement in which UE 16 is receiving wireless service from a coverage area provided by base station 12. While in the connected/active mode, base station 12 may schedule tune-away time periods in response to inactivity in communications between UE 16 and base station 12 or at times when base station 12 has no remaining data to transmit to UE 16. Alternatively or additionally, base station 12 may schedule tune-away time periods at regularly recurring times.

Also while in the connected/active mode, UE 16 may occasionally transmit a measurement report to serving base station 12. The measurement report may specify coverage areas detected by UE 16. For example, if UE 16 detects a neighboring coverage area provided by neighboring base station 14, a measurement report transmitted by UE 16 may include a signal level and an identifier of the neighboring coverage area. Based on the signal level of the neighboring coverage area and/or a signal level of the serving coverage area, serving base station 12 may initiate a handover process to hand over service of UE 16 from serving base station 12 to neighboring base station 14.

During the handover process, serving base station 12 may reference its neighbor list to determine an IP address or some other information associated with the reported identifier of the neighboring coverage area that would allow serving base station 12 to engage in communication with neighboring base station 14. However, the neighbor list of base station 12 may not include an entry associated with the neighboring coverage area identifier. In this scenario, in order to carry out the handover process, base station 12 may instruct UE 16 to obtain further identifying information of the neighboring coverage area from neighboring base station 14.

But before instructing UE 16 to obtain the further identifying information, base station 12 may determine certain operating characteristics of UE 16 in accordance with the present disclosure. For example, base station 12 may determine a total remaining battery energy level of UE 16. To facilitate such a determination, UE 16 may report its total remaining battery energy level to base station 12 over an uplink, such as a PUCCH or a PUSCH in an LTE system for instance. This battery information may be reported to base station 12 on a regular basis or in response to a request from base station 12, such as a request transmitted to UE 16 over a PDCCH or a PDSCH for instance. Further, base station 12 may determine an amount of data buffered for transmission between itself and UE 16. The amount of buffered data may include data buffered for transmission from base station 12 to UE 16, and the amount of buffered data may alternatively or additionally include data buffered from transmission from UE 16 to base station 12, which may be indicated in a BSR transmitted from UE 16 to base station 12 for instance.

Based on the determined total remaining battery energy level of UE 16, base station 12 may instruct UE 16 to tune away to obtain the further identifying information at different times. For instance, if base station 12 determines that the total remaining battery energy level of UE 16 is below a predetermined threshold level, then base station 12 may instruct UE 16 to wait until the next scheduled tune-away time to tune away from base station 12 and obtain the further identifying information. In an LTE system, for instance, such instructions may be sent in a control message, such as an RRC connection reconfiguration message, over a PDCCH. On the other hand, if base station 12 determines that the total remaining battery energy level of UE 16 is above a predetermined threshold level, then base station 12 may instruct UE 16 to tune away from base station 12 before for the next scheduled tune-away time.

In accordance with the present disclosure, base station 12 may further base its decision to instruct UE 16 to tune away at different times on an amount of data buffered for transmission between UE 16 and base station 12. For instance, if base station 12 determines that the total remaining battery energy level of UE 16 is below a predetermined threshold level or that an amount of data buffered for transmission between UE 16 and base station 12 is above a predetermined threshold amount, then base station 12 may instruct UE 16 to wait until the next scheduled tune-away time to tune away from base station 12 and obtain the further identifying information. On the other hand, if base station 12 determines that the total remaining battery energy level of UE 16 is above a predetermined threshold level and that an amount of data buffered for transmission between UE 16 and base station 12 is below a predetermined threshold amount, then base station 12 may instruct UE 16 to tune away from base station 12 before for the next scheduled tune-away time. In these examples, the amount of data may include an amount of data buffered for transmission from base station 12 to UE 16, an amount of data buffered for transmission from UE 16 to base station 12, or a combination of the two.

Alternatively, UE 16 may autonomously determine when to tune away from base station 12 based on the total remaining battery energy level of UE 16. For instance, base station 12 may instruct UE 16 to obtain further identifying information of the neighboring coverage area from neighboring base station 14 in response to determining that the neighbor list of base station 12 is missing information corresponding to the neighboring coverage area identifier of base station 14. Responsive to receiving such an instruction, UE 16 may determine its total remaining battery energy level. If UE 16 determines that its total remaining battery energy level is below a predetermined threshold level, then UE 16 may responsively wait until the next scheduled tune-away time to tune away from base station 12 in order to obtain the further identifying information from base station 14. On the other hand, if UE 16 determines that its total remaining battery energy level is above a predetermined threshold level, then UE 16 may responsively tune away from base station 12 before the next scheduled tune-away time.

In accordance with the present disclosure, UE 16 may further base its decision to tune away at different times on an amount of data buffered for transmission between UE 16 and base station 12. For instance, responsive to receiving an instruction from base station 12 to obtain further identifying information of the neighboring coverage area from neighboring base station 14, UE 16 may determine an amount of data buffered for transmission between UE 16 and base station 12. The amount of buffered data may include an amount of data buffered by UE 16 for transmission from UE 16 to base station 12. The amount of data may alternatively or additionally include an amount of data buffered for transmission from base station 12 to UE 16. To facilitate such a determination, base station 12 may transmit information to UE 16 indicating an amount of data buffered by base station 12 for transmission to UE 16. For instance, this information may be transmitted over a PDCCH or a PDSCH periodically or in response to a request sent by UE 16 over a PUCCH or a PUSCH.

Once UE 16 has determined the amount of buffered data, it may determine when to tune away from base station 12 to obtain the further identifying information from base station 14. For instance, if UE 16 determines that its total remaining battery energy level is below a predetermined threshold level or that the amount of data buffered for transmission between UE 16 and base station 12 is above a predetermined threshold amount, then UE 16 may responsively wait until the next scheduled tune-away time to tune away from base station 12 in order to obtain the further identifying information from base station 14. On the other hand, if UE 16 determines that its total remaining battery energy level is above a predetermined threshold level and that the amount of data buffered for transmission between UE 16 and base station 12 is below a predetermined threshold amount, then UE 16 may responsively tune away from base station 12 before the next scheduled tune-away time.

In any case, UE 16 tunes away from base station 12, either before or at the next scheduled tune-away time, to scan for and monitor a pilot or reference signal from base station 14 containing the further identifying information. Once UE 16 obtains the further identifying information from base station 14 and reports it to base station 12, base station 12 may query network infrastructure 22 for information that allows base station 12 to communicate with base station 14, such as an IP address. In an LTE system, for instance, UE 16 may obtain an ECGI from an SIB broadcast over a PDSCH by base station 14 and report this information to base station 12. Next, base station 12 may query an MME of network infrastructure 22 to map the ECI or ECGI to an IP address and/or other information of base station 14 to enable base station 12 to engage in signaling with base station 14. Base station 12 may then send a handover request to base station 14, base station 14 may then establish a radio link for UE 16, and UE 16 may then ultimately transition to be served instead by base station 14.

Figure 2:
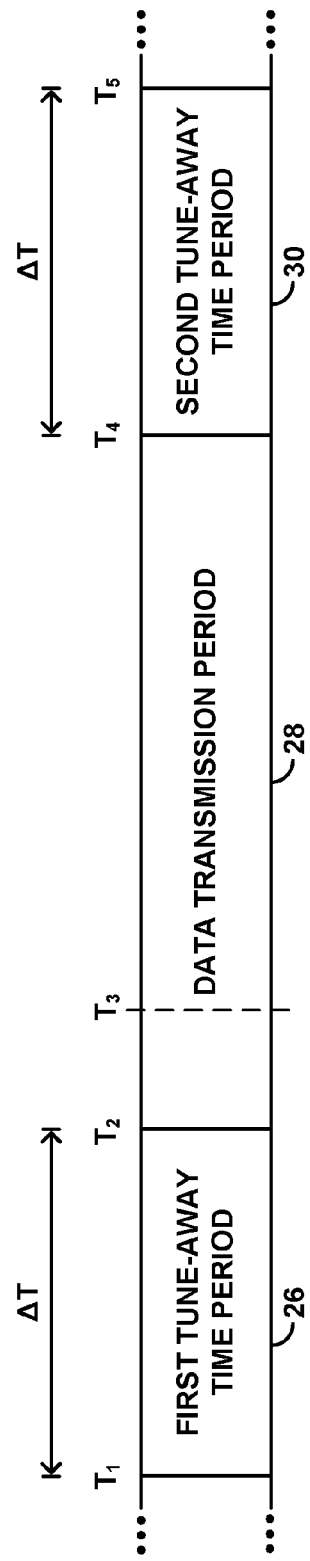
FIG. 2 is an example timing diagram of a handover process in accordance with the present disclosure.

FIG. 2 is next an example timing diagram in accordance with the handover process described above. As shown in FIG. 2, the timing diagram may include a first tune-away time period 26, a data transmission period 28, and a second tune-away time period 30.

In practice, a UE being served by a base station might receive operational parameters indicating a start time of the first tune-away time period 26, a duration of the first tune-away time period 26, a start time of the second tune-away time period 30, and a duration of the second tune-away time period 30. As previously discussed, such operational parameters may be broadcast by the base station to its served UEs over a control channel that carries various overhead messages, such as SIBs or the like, or they may be transmitted to the UE in a unicast control message, such as an RRC connection reconfiguration message for instance. As depicted in FIG. 2, the base station may send operational parameters to the UE indicating that the start time of the first tune-away time period 26 is at time $T_1$, that the start time of the second tune-away time period 30 is at time $T_4$, and that the durations of both the first tune-away time period 26 and the second tune-away time period 30 are $\Delta T$. In other examples, the first tune-away time period 26 and the second tune-away time period 30 may have different durations.

During the first tune-away time period 26, the serving base station stops transmitting data to the UE such that the UE may tune away from its serving base station without missing any information. After $\Delta T$ time has elapsed, at time $T_2$, the first tune-away time period 26 ends, and the data transmission period 28 begins. During the data transmission period 28, the UE and its serving base station may resume normal data communication through uplink and downlink channels.

Between the first tune-away time period 26 and the second tune-away time period 30 (i.e., between time $T_2$ and time $T_4$), for instance at time $T_3$, the UE may transmit to its serving base station a measurement report that indicates a signal level (e.g., reference signal strength, or signal-to-noise ratio) for the UE's currently serving coverage area as well as an identifier and a signal level for a neighboring base station detected by the UE. When the serving base station receives such a measurement report from the UE, the serving base station or other network node may decide to trigger handover of the UE to the neighboring base station. In general, handover may be triggered if the reported signal level of the serving coverage area is sufficiently weak, if the reported signal level of the neighboring coverage is sufficiently strong, and/or if the reported signal level of the neighboring coverage area is sufficiently stronger than the reported signal level of the serving coverage area.

In order to handover the UE to the neighboring base station, the serving base station may determine whether it recognizes the neighboring base station by referencing the serving base station's neighbor list to determine whether it contains an entry corresponding to the identifier of the neighboring base station. If the serving base station determines that it does not recognize the neighboring base station (e.g., the neighbor list does not contain an entry associated with the identifier of the neighboring base station), then the serving base station may instruct the UE to obtain further identifying information from the neighboring base station. To obtain the further information, the UE may need to tune away from the serving base station, for instance if the neighboring base station operates on a different frequency or air interface protocol than the serving base station.

The UE may tune away from the serving base station to obtain the further identifying information from the neighboring base station at different times based on various operating conditions of the UE. For instance, if the total remaining battery energy level of the UE is below a predetermined threshold level, then the UE may wait until the second tune-away time period 30 (e.g., at or shortly after time $T_4$) to tune away from the serving base station. Alternatively, if the total remaining battery energy level of the UE is above a predetermined threshold level, then the UE may tune away from the serving base station before the second tune-away time period 30 (e.g., between times $T_3$ and $T_4$).

As another example, if the total remaining battery energy level of the UE is below a predetermined threshold level or if an amount of data buffered for transmission between the UE and the serving base station is above a threshold amount, then the UE may wait until the second tune-away time period 30 to tune away from the serving base station. Alternatively, if the total remaining battery energy level of the UE is above a predetermined threshold level and if an amount of data buffered for transmission between the UE and the serving base station is below a threshold amount, then the UE may tune away from the serving base station before the second tune-away time period 30. The amount of data may include an amount of data buffered for transmission from the UE to the serving base station, an amount of data buffered for transmission from the serving base station to the UE, and/or a combination of the two.

Figure 3:
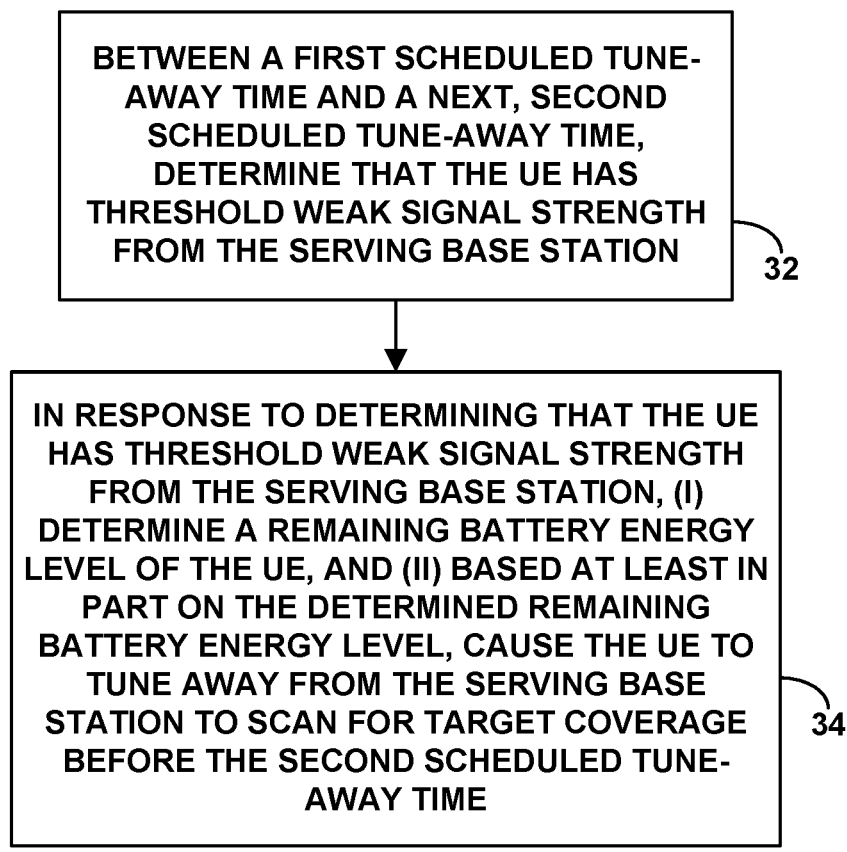
FIG. 3 is a flow chart depicting functions that can be carried out in accordance with the present disclosure.

FIG. 3 is next a flow chart depicting operations of a method that can be carried out by a UE or a base station in a wireless communication system in line with the discussion above, where the base station is configured to serve the UE over an air interface and where the UE is configured to tune away from the serving base station at scheduled tune-away times to scan for target coverage. As shown in FIG. 3, at block 32, between a first scheduled tune-away time and a next, second scheduled tune-away time, the UE and/or its serving base station determines that the UE has threshold weak signal strength from the serving base station. At block 34, in response to determining that the UE has threshold weak signal strength, the UE and/or its serving base station (i) determines a remaining battery energy level of the UE, and (ii) based at least in part on the determined remaining battery energy level, causes the UE to tune away from the serving base station to scan for target coverage before the second scheduled tune-away time.

In line with the discussion above, the first and second scheduled tune-away times may be scheduled in response to detecting a period of inactivity between the UE and its serving base station or after the serving base station has no further data to transmit to the UE. Also, when the UE tunes away from the serving base station, it may scan for signals from a neighboring base station that is not identified in a neighbor list of the serving base station in order to obtain identifying information from the neighboring base station. Further, the serving base station and the neighboring base station may be LTE eNodeBs of an LTE network, and the UE may tune away from the serving base station to obtain an ECI or an ECGI from the neighboring base station.

Figure 4:
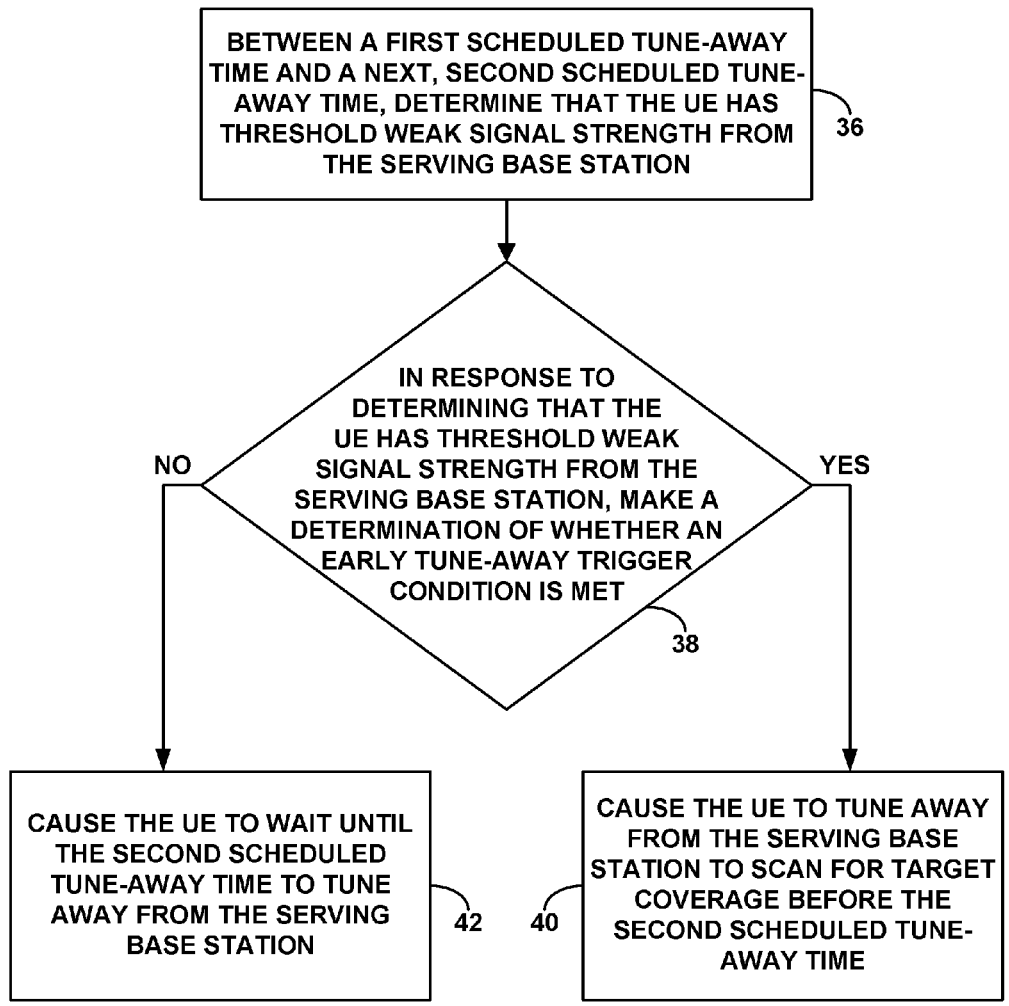
FIG. 4 is another flow chart depicting functions that can be carried out in accordance with the present disclosure.

FIG. 4 is next another flow chart depicting operations of a method that can be carried out by a UE or a base station in a wireless communication system in line with the discussion above, where the base station is configured to serve the UE over an air interface and where the UE is configured to tune away from the serving base station at scheduled tune-away times to scan for target coverage. As shown in FIG. 4, at block 36, between a first scheduled tune-away time and a next, second scheduled tune-away time, the UE and/or its serving base station determines that the UE has threshold weak signal strength from the serving base station.

At block 38, in response to determining that the UE has threshold weak signal strength, the UE and/or its serving base station makes a determination of whether an early tune-away trigger condition is met. The early tune-away trigger condition may be based on certain operating conditions of the UE. As an example, making a determination that the early tune-away trigger condition is met may include determining that a total remaining battery energy level of the UE is above a predetermined threshold energy level. As another example, making a determination that the early tune-away trigger condition is met may further include determining that an amount of data buffered for transmission between the UE and the serving base station is below a predetermined threshold amount, where the amount of data includes either an amount of data buffered for transmission from the UE to the serving base station or an amount of data buffered for transmission from the serving base station to the UE, or a combination of the two. In any case, if the early tune-away trigger condition is met, then at block 40 the UE and/or the serving base station causes the UE to tune away from the serving base station to scan for target coverage before the second scheduled tune-away time. If the early tune-away trigger condition is not met, then at block 42 the UE and/or its serving base station causes the UE to wait until the second scheduled tune-away time to tune away from the serving base station.

Again here, the first and second scheduled tune-away times may be scheduled in response to detecting a period of inactivity between the UE and its serving base station or after the serving base station has no further data to transmit to the UE. Also, when the UE tunes away from the serving base station, it may scan for signals from a neighboring base station that is not identified in a neighbor list of the serving base station in order to obtain identifying information from the neighboring base station. Further, the serving base station and the neighboring base station may be LTE eNodeBs of an LTE network, and the UE may tune away from the serving base station to obtain an ECGI from the neighboring base station.

Figure 5:
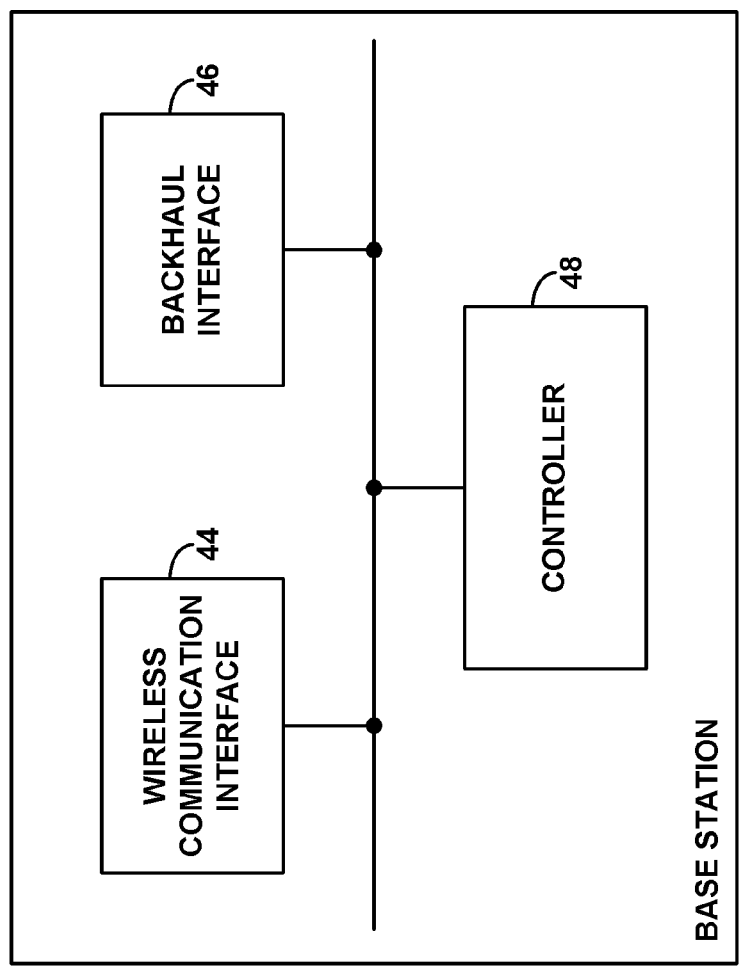
FIG. 5 is a simplified block diagram of a base station operable in accordance with the present disclosure.

FIG. 5 is next a simplified block diagram of an example base station, such as base station 12 discussed above for instance. This base station could take various forms, such as a macro base station of the type that typically includes an antenna tower and provides a broad range of coverage, or a small cell (e.g., femtocell) or relay, which typically has a much smaller form factor and provides a smaller range of coverage. As shown, the example base station includes a wireless communication interface 44 through which to engage in communication with UEs served by the base station, a backhaul communication interface 46 through which to engage in communication with other base stations and with various network infrastructure, and a controller 48 configured to cause the base station to carry out various base station operations described herein.

In practice, the wireless communication interface 44 may include a transceiver configured to serve UEs in accordance with one or more air interface protocols such as those noted above, along with a power amplifier and antenna structure that radiates to provide for air interface communication between the base station and served UEs. The backhaul wireless communication interface 46 may then comprise a wired or wireless network communication module, such as an Ethernet interface, through which the base station can communicate with other entities.

The controller 48 may also take various forms, including various combinations of hardware, firmware, and software for instance. By way of example, the controller 48 could comprise one or more general purpose processors (e.g., microprocessors) and/or one or more special purpose processors (e.g., application specific integrated circuits), and one or more non-transitory data storage elements (e.g., magnetic, optical, and/or flash storage). The data storage could then hold program instructions executable by the processor(s) to carry out various base station functions described herein, and could further hold various reference data, such as the operational parameters and neighbor list data described above for instance.

In an example implementation, in which a UE served by the base station is configured to tune away from the base station at scheduled tune-away times to scan for target coverage, the controller 48 may be arranged to, between a first scheduled tune-away time and a next, second scheduled tune-away time, determine that the UE has threshold weak signal strength from the base station. Responsive to determining that the UE has threshold weak signal strength, the controller 48 may further be arranged to make a determination of whether an early tune-away trigger condition is met. The early tune-away trigger condition may be based on certain operating conditions of the UE. As an example, making a determination that the early tune-away trigger condition is met may include determining that a total remaining battery energy level of the UE is above a predetermined threshold energy level. As another example, making a determination that the early tune-away trigger condition is met may further include determining that an amount of data buffered for transmission between the UE and the base station is below a predetermined threshold amount, where the amount of data includes either an amount of data buffered for transmission from the UE to the base station or an amount of data buffered for transmission from the base station to the UE, or a combination of the two. In any case, if the controller 48 determines that the early tune-away trigger condition is met, then the controller 48 causes the UE to tune away from the base station to scan for target coverage before the second scheduled tune-away time. If the controller 48 determines that the early tune-away trigger condition is not met, then the controller 48 causes the UE to wait until the second scheduled tune-away time to tune away from the base station.

In line with the discussion above, the first and second scheduled tune-away times may be scheduled in response to detecting a period of inactivity between the UE and the base station or after the base station has no further data to transmit to the UE. Also, when the UE tunes away from its serving base station, it may scan for signals from a neighboring base station that is not identified in a neighbor list of the serving base station in order to obtain identifying information from the neighboring base station. Further, the serving base station and the neighboring base station may be LTE eNodeBs of an LTE network, and the UE may tune away from the serving base station to obtain an ECGI from the neighboring base station.

Figure 6:
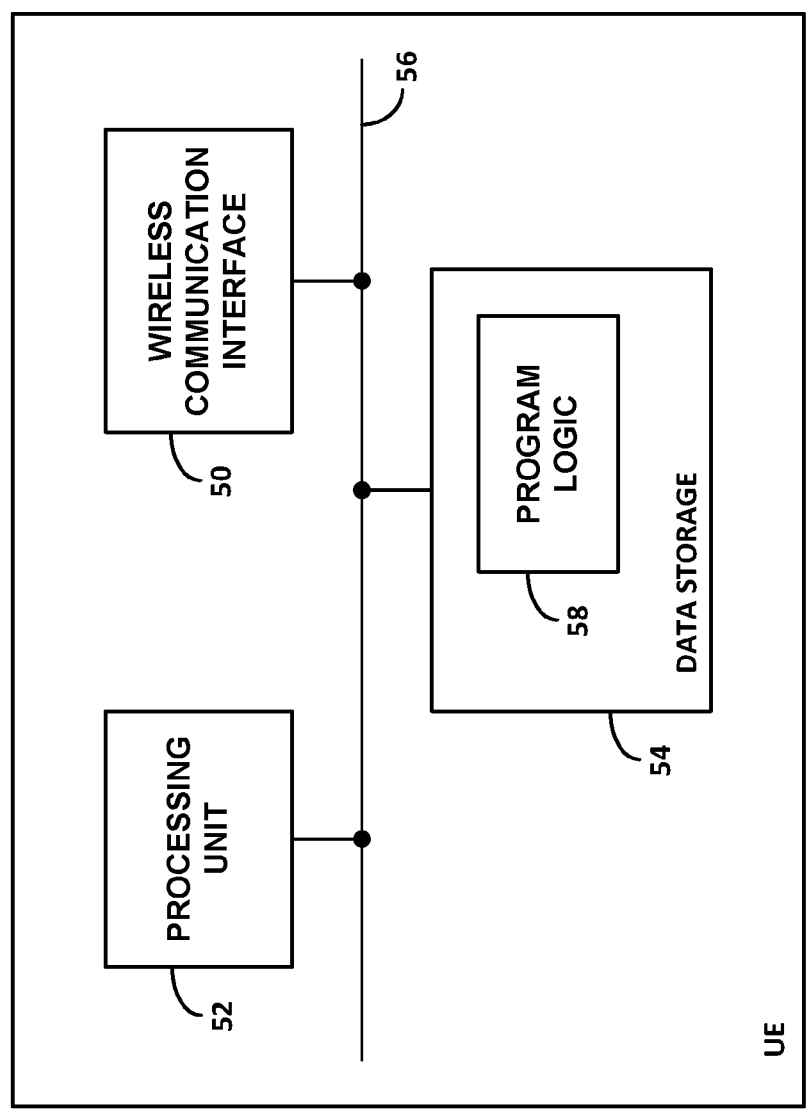
FIG. 6 is a simplified block diagram of a UE operable in accordance with the present disclosure.

Finally, FIG. 6 is a simplified block diagram depicting an example UE arranged to carry out various functions of the present methods. Such a UE may function as the UE 16 shown in FIG. 1 for instance and may implement many of the functions described above.

As shown in FIG. 6, the example UE includes a wireless communication interface 50, a processing unit 52, and data storage 54, all of which may be communicatively linked together by a system bus, network, or other connection mechanism 56. Variations from this arrangement are of course possible as well, including addition and omission of elements, combination of elements, and distribution of elements in any of a variety of ways.

In the arrangement shown, wireless communication interface 50 may function to engage in air interface communication with base stations such as those shown in FIG. 1. As such, the wireless communication interface may include an antenna structure and a chipset arranged to support wireless communication according to one or more air interface protocols, such as those discussed above for instance.

Processing unit 52 may comprise one or more general purpose processors (e.g., microprocessors) and/or more special purpose processors (e.g., application specific integrated circuits or the like) and may be integrated in whole or in part with wireless communication interface 50. Data storage 54 may then comprise one or more volatile and/or non-volatile storage components, particularly non-transitory storage, such as magnetic, optical, or flash memory for instance, and may be integrated in whole or in part with processing unit 52. Data storage may also or alternatively be provided separately, as a non-transitory machine readable medium.

As shown, data storage 54 may hold (e.g., contain, store, or be encoded with) program logic 58 (e.g., machine language instructions or other program instructions, markup or the like) executable by the processing unit 52 to carry out various functions described herein. In practice, for instance, when the UE is being served by a base station over an air interface, those functions may include causing the UE to tune away from the serving base station at scheduled tune-away times to scan for target coverage. The first and second scheduled tune-away times may be scheduled by the serving base station in response to detecting a period of inactivity between the UE and the serving base station or after the serving base station has no further data to transmit to the UE.

The functions may further include, between a first scheduled tune-away time and a next, second scheduled tune-away time, (i) determining that the UE has threshold weak signal strength from the serving base station, and (ii) responsive to determining that the UE has threshold weak signal strength, making a determination of whether an early tune-away trigger condition is met, where the early tune-away trigger condition is based on certain operating conditions of the UE. As an example, making a determination that the early tune-away trigger condition is met may include determining that a total remaining battery energy level of the UE is above a predetermined threshold energy level. As another example, making a determination that the early tune-away trigger condition is met may further include determining that an amount of data buffered for transmission between the UE and the base station is below a predetermined threshold amount, where the amount of data includes either an amount of data buffered for transmission from the UE to the base station or an amount of data buffered for transmission from the base station to the UE, or a combination of the two.

In any case, if the processing unit 52 determines that the early tune-away trigger condition is met, then the processing unit 52 causes the UE to tune away from the serving base station to scan for target coverage before the second scheduled tune-away time. If the processing unit 52 determines that the early tune-away trigger condition is not met, then the processing unit 52 causes the UE to wait until the second scheduled tune-away time to tune away from the serving base station.

In line with the discussion above, when the UE tunes away from its serving base station, it may scan for signals from a neighboring base station that is not identified in a neighbor list of the serving base station in order to obtain identifying information from the neighboring base station. Further, the serving base station and the neighboring base station may be LTE eNodeBs of an LTE network, and the UE may tune away from the serving base station to obtain an ECGI from the neighboring base station.

Exemplary embodiments have been described above. Those skilled in the art will understand, however, that changes and modifications may be made to these embodiments without departing from the true scope and spirit of the invention.

We claim:

1. A method for controlling a user equipment device (UE), wherein the UE is served by a serving base station, wherein the UE is configured to tune away from the serving base station at scheduled tune-away times to scan for target coverage, the method comprising:
 between a first one of the scheduled tune-away times and a next, second one of the scheduled tune-away times, (a) determining that the UE has threshold weak signal strength from the serving base station, and (b) responsive to determining that the UE has threshold weak signal strength from the serving base station, performing an early tune-away process, the early tune-away process including (i) determining that a remaining battery energy level of the UE is above a threshold energy level, (ii) determining that an amount of bearer data buffered for transmission between the UE and the serving base station is below a threshold data amount, and (iii) based on both the remaining battery energy level of the UE being above the threshold energy level and the amount of buffered bearer data being below the threshold data amount, causing the UE to tune away from the serving base station before the second scheduled tune-away time to scan for target coverage.

2. The method of claim 1, wherein determining that the amount of bearer data buffered for transmission between the UE and the serving base station is below the threshold data amount comprises determining that an amount of bearer data buffered for transmission from the UE to the serving base station is below the threshold data amount.

3. The method of claim 1, wherein determining that the amount of bearer data buffered for transmission between the UE and the serving base station is below the threshold data amount comprises determining that an amount of bearer data buffered for transmission from the serving base station to the UE is below the threshold data amount.

4. The method of claim 1, wherein causing the UE to tune away from the base station before the second scheduled tune-away time to scan for target coverage comprises causing the UE to determine identifying information of a neighboring base station and to report the determined identifying information to the serving base station.

5. The method of claim 4, wherein the serving base station is an evolved Node-B (eNodeB) of an Orthogonal Frequency Division Multiple Access (OFDMA) network, and wherein causing the UE to determine identifying information of the neighboring base station comprises causing the UE to determine an enhanced cell global identity (eCGI) of the neighboring base station.

6. The method of claim 1, wherein the UE comprises (i) a wireless communication interface for engaging in communication with the serving base station, (ii) a data storage unit configured to store executable instructions, and (iii) a processing unit configured to execute the instructions to implement the method.

7. The method of claim 1, wherein the serving base station comprises (i) a wireless communication interface for engaging in communication with the UE, (ii) a data storage unit configured to store executable instructions, and (iii) a processing unit configured to execute the instructions to implement the method.

8. A method for controlling a user equipment device (UE), wherein the UE is served by a serving base station, wherein the UE is configured to tune away from the serving base station at scheduled tune-away times to scan for target coverage, the method comprising:
 between a first one of the scheduled tune-away times and a next, second one of the scheduled tune-away times, (a) determining that the UE has threshold weak signal strength from the serving base station, and (b) responsive to determining that the UE has threshold weak signal strength from the serving base station, performing a tune-away control process,
 wherein the tune-away control process comprises:
  (i) making a determination of whether an early tune-away trigger condition is met, wherein the early tune-away trigger condition comprises both a remaining battery energy level of the UE being above a threshold energy level and an amount of bearer data buffered for transmission between the UE and the serving base station being below a threshold data amount,
  (ii) if the determination is that the early tune-away trigger condition is met, then causing the UE to tune away from the serving base station before the second scheduled tune-away time to scan for target coverage, and (iii) if the determination is that the early tune-away trigger condition is not met, then causing the UE to wait for the second scheduled tune-away time to tune away from the serving base station.

9. The method of claim 8, wherein causing the UE to tune away from the base station before the second scheduled tune-away time to scan for target coverage comprises causing the UE to determine identifying information of a neighboring base station and to report the determined identifying information to the serving base station.

10. The method of claim 9, wherein the serving base station is an evolved Node-B (eNodeB) of an Orthogonal Frequency Division Multiple Access (OFDMA) network, and wherein causing the UE to determine identifying information of the neighboring base station comprises causing the UE to determine an enhanced cell global identity (eCGI) of the neighboring base station.

11. The method of claim 8, wherein the UE comprises (i) a wireless communication interface for engaging in communication with the serving base station, (ii) a data storage unit configured to store executable instructions, and (iii) a processing unit configured to execute the instructions to implement the method.

12. The method of claim 8, wherein the serving base station comprises (i) a wireless communication interface for engaging in communication with the UE, (ii) a data storage unit configured to store executable instructions, and (iii) a processing unit configured to execute the instructions to implement the method.

13. The method of claim 8, wherein the early tune-away trigger condition further comprises an amount of bearer data buffered for transmission from the UE to the serving base station below the threshold data amount.

14. The method of claim 8, wherein the early tune-away trigger condition further comprises an amount of bearer data buffered for transmission from the serving base station to the UE being below the threshold data amount.

15. A base station comprising:
  a wireless communication interface through which to engage in communication with a user equipment device (UE) served by the base station, wherein the UE is configured to tune away from the base station at scheduled tune-away times to scan for target coverage; and
  a controller configured to carry out operations including:
    between a first one of the scheduled tune-away times and a next, second one of the scheduled tune-away times, (a) receiving, from the UE, an indication that the UE has threshold weak signal strength from the base station, and (b) responsive to receiving the indication, performing a tune-away control process, wherein the tune-away control process comprises:
    (i) making a determination of whether an early tune-away trigger condition is met, wherein the early tune-away trigger condition comprises both a remaining battery energy level of the UE being above a threshold energy level and an amount of bearer data buffered for transmission between the UE and the base station being below a threshold data amount,
    (ii) if the determination is that the early tune-away trigger condition is met, then causing the UE to tune away from the base station before the second scheduled tune-away time to scan for target coverage, and
    (iii) if the determination is that the early tune-away trigger condition is not met, then causing the UE to wait for the second scheduled tune-away time to tune away from the base station.

16. The base station of claim 15, wherein causing the UE to tune away from the base station before the second scheduled tune-away time to scan for target coverage comprises causing the UE to determine identifying information of a neighboring base station and to report the determined identifying information to the base station.

17. The base station of claim 15, wherein the base station is an evolved Node-B (eNodeB) of an Orthogonal Frequency Division Multiple Access (OFDMA) network, and wherein causing the UE to determine identifying information of the neighboring base station comprises causing the UE to determine an enhanced cell global identity (eCGI) of the neighboring base station.

18. The base station of claim 15, wherein the early tune-away trigger condition further comprises an amount of bearer data buffered for transmission from the UE to the serving base station below the threshold data amount.

19. The base station of claim 15, wherein the early tune-away trigger condition further comprises an amount of bearer data buffered for transmission from the serving base station to the UE being below the threshold data amount.

* * * * *